(12) United States Patent  
Palmer (10) Patent No.: US 10,186,981 B2  
(45) Date of Patent: Jan. 22, 2019

(54) SYSTEMS AND METHODS OF DELIVERING RECTIFIED VOLTAGE TO A LOAD

(71) Applicant: Fred Palmer, Danvers, MA (US)

(72) Inventor: Fred Palmer, Danvers, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/092,688

(22) Filed: Apr. 7, 2016

(65) Prior Publication Data

US 2016/0226395 A1 Aug. 4, 2016

Related U.S. Application Data

(62) Division of application No. 13/629,710, filed on Sep. 28, 2012, now Pat. No. 9,748,858.

(51) Int. Cl.
*H02M 7/219* (2006.01)
*H02M 7/06* (2006.01)
(Continued)

(52) U.S. Cl.
CPC .............. *H02M 7/06* (2013.01); *H02M 1/42* (2013.01); *H02M 1/4208* (2013.01);
(Continued)

(58) Field of Classification Search
CPC ............ H02M 2001/325; H02M 1/42; H02M 1/4208; H02M 2001/4275; H02M 7/06; H02M 3/1582; H02M 7/2176; H05B 33/0896; H05B 33/0815; H05B 33/0848; Y02B 20/347; Y10T 307/858
(Continued)

(56) References Cited

U.S. PATENT DOCUMENTS 6,924,630 B1 8/2005 Pacala
8,569,963 B2 10/2013 Walters
(Continued)

FOREIGN PATENT DOCUMENTS

EP 2 479 878 A1 7/2012

OTHER PUBLICATIONS

Duncan Waters, Extended European Search Report for EP 13183482.2, dated Dec. 18, 2013, pp. 1-8, European Patent Office, Munich, Germany.

*Primary Examiner* — Jue Zhang
*Assistant Examiner* — Jye-June Lee
(74) *Attorney, Agent, or Firm* — Shaun P. Montana (57) ABSTRACT

A solid state light source driver circuit that operates in either a buck convertor or a boost convertor configuration is provided. The driver circuit includes a controller, a boost switch circuit and a buck switch circuit, each coupled to the controller, and a feedback circuit, coupled to the light source. The feedback circuit provides feedback to the controller, representing a DC output of the driver circuit. The controller controls the boost switch circuit and the buck switch circuit in response to the feedback signal, to regulate current to the light source. The controller places the driver circuit in its boost converter configuration when the DC output is less than a rectified AC voltage coupled to the driver circuit at an input node. The controller places the driver circuit in its buck converter configuration when the DC output is greater than the rectified AC voltage at the input node.

7 Claims, 7 Drawing Sheets

(51) Int. Cl.
 *H02M 1/42* (2007.01)
 *H02M 7/217* (2006.01)
 *H02M 3/158* (2006.01)
 *H05B 33/08* (2006.01)

(52) U.S. Cl.
 CPC ....... *H02M 3/1582* (2013.01); *H02M 7/2176* (2013.01); *H05B 33/0815* (2013.01); *H05B 33/0848* (2013.01); *H05B 33/0896* (2013.01); *H02M 2001/4275* (2013.01)

(58) Field of Classification Search
 USPC .............................................. 363/50, 52, 53
 See application file for complete search history.

(56) References Cited

U.S. PATENT DOCUMENTS

| | | | |
|---|---|---|---|
| 9,048,746 B2 * | 6/2015 | Luthi ...................... | H02M 1/36 |
| 2003/0001522 A1 | 1/2003 | Newman, Jr. et al. | |
| 2007/0085519 A1 | 4/2007 | Xu | |
| 2009/0021969 A1 * | 1/2009 | Butler ................. | H02M 7/2176 |
| | | | 363/126 |
| 2010/0259196 A1 * | 10/2010 | Sadwick ........... | H02M 3/33515 |
| | | | 307/39 |
| 2011/0037446 A1 | 2/2011 | Engelhardt et al. | |
| 2013/0077362 A1 | 3/2013 | Kumar | |
| 2013/0307508 A1 | 11/2013 | Hallak | |

* cited by examiner

SYSTEMS AND METHODS OF DELIVERING RECTIFIED VOLTAGE TO A LOAD

CROSS-REFERENCE TO RELATED APPLICATION

The present application is a divisional of, and claims priority of, U.S. patent application Ser. No. 13/629,710, entitled "SOLID STATE LIGHT SOURCE DRIVER ESTABLISHING BUCK OR BOOST OPERATION" and filed Sep. 28, 2012, the entire contents of which are hereby incorporated by reference.

STATEMENT OF GOVERNMENT INTEREST

This invention was made with U.S. Government support under DOE Cooperative Agreement No. DE-EE0000611, awarded by the U.S. Department of Energy. The U.S. Government may have certain rights in this invention.

TECHNICAL FIELD

The present invention relates to lighting, and more specifically, to electronic drivers for solid state light sources.

BACKGROUND

The development of high-brightness solid state light sources has led to use of such devices in various lighting fixtures. In general, a solid state light source operates in a fundamentally different way than an incandescent lamp or a gas discharge lamp, and therefore may not be connectable to conventional lighting fixtures designed for such conventional light sources. A driver circuit may be used, however, to allow use of a lamp including solid state light sources as a retrofit for conventional lighting fixtures. A driver circuit for a solid state light source typically converts an alternating current (AC) input, such as a 120V/60 Hz line input or input from a dimmer switch, to a stable direct current (DC) voltage, which is used to drive the solid state light source. Such a circuit typically incorporates a rectifier, which receives the AC input, and a switching converter circuit. The switching converter circuit receives a rectified AC output from the rectifier, and provides a stable, regulated DC output to the solid state light source.

A variety of switching converter circuit configurations are well-known in the art. Certain types of switching converter circuits include known configurations, such as buck converters, boost converters, buck-boost converters, etc., which are generally categorized as switching regulators. These devices include a switch, e.g. a transistor, which is selectively operated to allow energy to be stored in an energy storage device, e.g. an inductor, and then transferred to one or more filter capacitors. The filter capacitor(s) provide a relatively smooth DC output voltage to the load and provide essentially continuous energy to the load between energy storage cycles.

Another known type of switching converter includes a transformer-based switching regulator, such as a "flyback" converter. In a transformer-based switching regulator, the primary side of the transformer is coupled to the rectified AC output of the rectifier. The regulated DC output voltage is provided at the secondary side of the transformer, which is electrically isolated from the primary side of the transformer.

SUMMARY

One issue with conventional drive circuits, such as those described above, arises when alternately driving solid state light sources of different colors to achieve a desired mixing of the colors at a distance. In such configurations, different types and numbers of solid state light sources of different colors may have different current draw requirements and may be driven at different times. This may produce a varying output voltage for the driver circuit, which is sometimes greater than the input voltage and sometimes less than the input voltage. A known approach to dealing with such mis-matched voltage ranges at the input and output of the driver circuit is to employ a "buck-boost" or "flyback" converter configuration. Both of these known configurations store energy in an inductor, and then discharge the energy to a load that is effectively isolated from the input. However, because these configurations may store one hundred percent of the energy in an inductor before delivering it to a load, devices including such configurations exhibit relatively large inductor losses. Another issue with such known driver circuit configurations is that the AC input voltage varies between a peak level and zero, such there is a time period in each cycle of the AC input when there is little or no input voltage for supplying current to the load. This can affect the efficacy, i.e. lumens per watt (LPW), of the light source.

Embodiments of the present invention provide a driver circuit that includes a switching converter that is placed in a buck converter configuration or a boost converter configuration in response to the output voltage of the driver circuit as the output voltage varies with switching of one or more solid state light sources between "on" and "off" states. This may be accomplished using a single switching converter controller that sets the switching converter in either a buck or boost configuration and also controls buck and boost switch circuits. Advantageously, such a circuit may be implemented in a small size and avoids the need for separate controllers for separate buck and boost converters, or the need to use a buck-boost or flyback configuration that suffers from the deficiencies described above. Embodiments may also, or alternatively, include an energy storage circuit coupled to an input voltage. The energy storage circuit may deliver current to a driver circuit during time periods when the input voltage drops below a predetermined threshold. Such an energy storage circuit allows for high light source efficacy, i.e. lumens per watt (LPW).

In an embodiment, there is provided a driver circuit. The driver circuit includes: a controller circuit; a boost switch circuit coupled to the controller circuit; a buck switch circuit coupled to the controller circuit; and a feedback circuit coupled to a light source and configured to provide a feedback signal to the controller circuit representative of a DC output of the driver circuit; wherein the controller circuit is configured to control the boost switch circuit and the buck switch circuit in response to the feedback signal to regulate current to the light source using a boost converter configuration when the DC output is less than a rectified AC voltage coupled to the driver circuit at an input node, and to regulate current to the light source using a buck converter configuration when the DC output is greater than the rectified AC voltage at the input node.

In a related embodiment, the controller circuit may be configured to provide a first output to the boost switch circuit and a second output to the buck switch circuit in response to the feedback signal, wherein the first output may be configured to establish the boost converter configuration and the second output places the buck converter switch in a conducting state. In another related embodiment, the controller circuit may be configured to provide a first output to the boost switch circuit and a second output to the buck switch circuit in response to the feedback signal, wherein the second output may be configured to establish the buck converter configuration while the first output places the boost converter switch in a non-conducting state.

In yet another related embodiment, the boost converter configuration may include: the boost switch circuit; an inductor; a first diode; and a capacitor; wherein the boost switch circuit may be coupled to a node between the inductor and the first diode and the capacitor may be coupled between the first diode and ground. In a further related embodiment, the buck converter configuration may include: the inductor; the capacitor; the buck switch circuit, wherein the buck switch circuit may include a switch coupled between the input node and the inductor; and a second diode coupled to a node between the switch and the inductor.

In still another related embodiment, the buck switch circuit may include a switch and an comparator, wherein the controller circuit may include a buck control signal output and a clock output, and wherein the comparator may include a first input coupled to the buck control signal output, a second input coupled to the clock output, and an output coupled to the switch, such that the conducting state of the switch varies in response to the output of the comparator. In a further related embodiment, the controller circuit may be an integrated circuit controller and wherein the buck control signal output may include an error amplifier output of the integrated circuit controller.

In yet still another related embodiment, the light source may include a first set of solid state light sources and a second set of solid state light sources, wherein the first set of solid state light sources may include at least one solid state light source through which current is switched in response to an output of a mixing circuit, wherein the second set of solid state light sources may include at least one additional solid state light source configured to remain in a light-emitting state while the mixing circuit switches current through the at least one solid state light source, the second set of solid state light sources may be coupled in series with a parallel combination of the first set of solid state light sources and a mixing circuit switch, wherein the mixing circuit switch may be configured to switch current through the first set of solid state light sources in response to the output of the mixing circuit. In a further related embodiment, the driver circuit may further include a voltage reference circuit, wherein the voltage reference circuit may include a resistor coupled in series with the second set of solid state light sources and the parallel combination of the first set of solid state light sources and the mixing circuit switch.

In still yet another related embodiment, the driver circuit may further include: a rectifier circuit, wherein the rectifier circuit may be configured to receive an alternating current (AC) input voltage and to provide the rectified AC voltage at the input node; and an energy storage circuit including: a switch controller circuit; an input switch circuit coupled to the switch controller circuit and the rectifier circuit; an energy storage switch circuit coupled to the switch controller circuit and a capacitor circuit; wherein the switch controller circuit may be configured to provide a controller output to the input switch circuit and the energy storage switch circuit in response to the rectified AC voltage, to couple the rectified AC voltage to a load and to charge the capacitor circuit when the rectified AC voltage is greater than a predetermined value, and to couple the capacitor circuit to the load to discharge the capacitor circuit through the load when the rectified AC voltage is less than the predetermined value.

In another embodiment, there is provided a method of providing a direct current (DC) output to a light source. The method includes: coupling a feedback signal representative of the DC output to a controller circuit; providing an output from the controller circuit to a boost switch circuit in response to the DC output, to regulate current to the light source using a boost converter configuration when the DC output is less than a rectified AC voltage coupled to the switching converter circuit; and providing an output from the controller circuit to a buck switch circuit in response to the DC output to regulate current to the light source using a buck converter configuration when the DC output is greater than the rectified AC voltage.

In a related embodiment, providing an output from the controller circuit to a boost switch circuit may include: providing an output from the controller circuit to a boost switch circuit in response to the DC output, to regulate current to the light source using a boost converter configuration when the DC output is less than a rectified AC voltage coupled to the switching converter circuit, wherein the boost converter configuration may include the boost switch circuit, an inductor, a first diode, and a capacitor, wherein the boost switch circuit is coupled to a node between the inductor and the first diode, and wherein the capacitor is coupled between the first diode and ground. In a further related embodiment, providing an output from the controller circuit to a buck switch circuit may include: providing an output from the controller circuit to a buck switch circuit in response to the DC output to regulate current to the light source using a buck converter configuration when the DC output is greater than the rectified AC voltage, wherein the buck converter configuration may include the buck switch circuit, the inductor, the capacitor, and a second diode, wherein the buck switch circuit may include a switch coupled between the rectified AC voltage and the inductor, and wherein the second diode is coupled to a node between the switch and the inductor.

In another embodiment, there is provided an energy storage circuit. The energy storage circuit includes: a switch controller circuit; an input switch circuit coupled to the switch controller circuit and a rectifier circuit; and an energy storage switch circuit coupled to the switch controller circuit and a capacitor circuit; wherein the switch controller circuit may be configured to provide a controller output to the input switch circuit and the energy storage switch circuit in response to a rectified AC voltage, to couple the rectified AC voltage to a load and to charge the capacitor circuit when the rectified AC voltage is greater than a predetermined value, and to couple the capacitor circuit to the load to discharge the capacitor circuit through the load when the rectified AC voltage is less than the predetermined value.

In a related embodiment, the input switch circuit and the rectifier circuit may be coupled in series across the load. In another related embodiment, the energy storage switch circuit and the capacitor circuit may be coupled in series across the load. In still another related embodiment, the input switch circuit may include a transistor coupled between the rectifier circuit and ground, and wherein the controller output is coupled to a gate of the transistor. In yet another related embodiment, the energy storage switch circuit may include a transistor coupled in series with the capacitor circuit, wherein the controller output may be coupled to a gate of the transistor, and wherein a Zener diode may be coupled between the gate of the transistor and ground. In still yet another related embodiment, the capacitor circuit may include first and second capacitors configured to charge in a series configuration and to discharge in a parallel configuration.

In another embodiment, there is provided a method of controlling delivery of a rectified AC voltage to a load. The method includes: sensing the rectified AC voltage; controlling a first switch in response to the sensed rectified AC voltage to couple the rectified AC voltage to the load as long as the rectified AC voltage exceeds a predetermined value; controlling a second switch in response to the rectified AC voltage to charge at least one capacitor; and controlling the first switch and the second switch in response to the rectified AC voltage to discharge the at least one capacitor to the load when the AC voltage is below the predetermined value.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
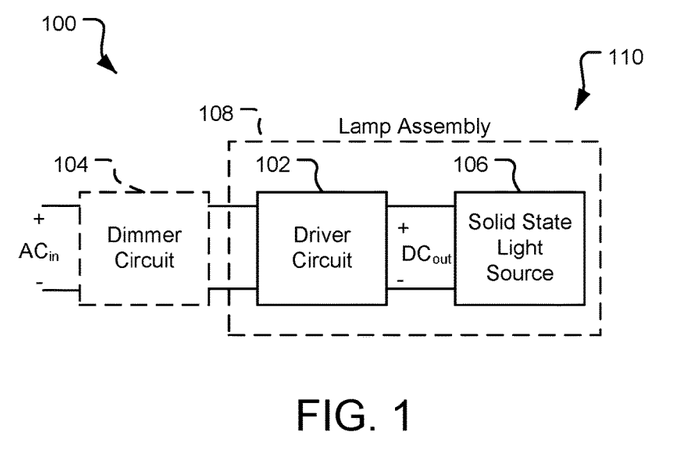
FIG. 1 shows a block diagram of a system including a driver circuit according to embodiments disclosed herein.

FIG. 1 shows a simplified block diagram of a system 100 that includes a driver circuit 102, which receives an alternating current (AC) input $AC_{in}$, either directly or through an optional known dimmer circuit 104, and provides a regulated direct current (DC) output $DC_{out}$ to drive a solid state light source 106. The solid state light source 106 may include one or more light emitting diodes (LEDs), one or more organic light emitting diodes (OLEDs), one or more polymer light emitting diodes (PLEDs), and/or any combinations thereof, arranged in any known configurations, such as but not limited to one or more dies on a substrate, bare or packaged in a chip, one or more chips, one or more modules including one or more bare dies or packaged dies, and combinations thereof, connected and/or interconnected in any known way. Thus, in some embodiments, the solid state light source 106 includes more than one solid state light sources. In some embodiments, the solid state light source 106 is configured to occupy a certain space, such as that of a lamp (shown in block form as the optional lamp assembly 108). The space may be, but is not limited to, a space defined a particular type of lamp, such as but not limited to an MR-16-type lamp. In some embodiments, the input $AC_{in}$ is provided directly from a 120 VAC/60 Hz line source. It is to be understood, however, that embodiments may, and in some embodiments do, operate from a DC source, such as but not limited to a 10-16 VDC source, and/or from other AC sources, such as but not limited to a 220-240 VAC at 50-60 Hz, a 12 VAC source, etc. The driver circuit 102 converts the AC input voltage $AC_{in}$ to a regulated DC output voltage $DC_{out}$.

Figure 2:
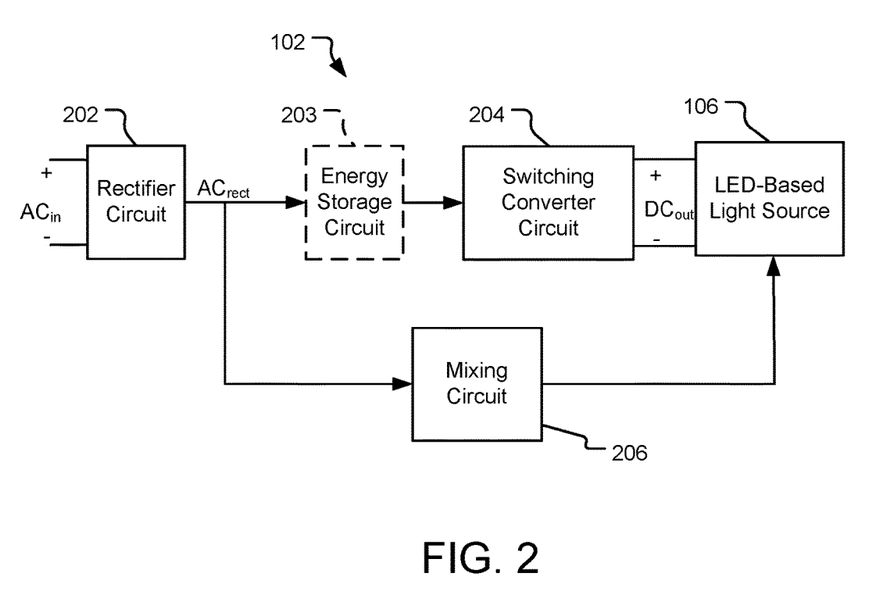
FIG. 2 is a block diagram of a driver circuit coupled to a light source according to embodiments disclosed herein.

FIG. 2 is a block diagram that conceptually illustrates the functionality of the driver circuit 102. As shown, the driver circuit 102 includes a rectifier circuit 202, an optional energy storage circuit 203, a switching converter circuit 204, and a mixing circuit 206. A regulated DC output $DC_{out}$ of the switching converter circuit 204 is coupled to the solid state light source 106 to drive the solid state light source 106. The AC input voltage $AC_{in}$ is coupled to rectifier circuit 202, either directly or through a dimmer circuit 104, such as shown in FIG. 1. The rectifier circuit 202 may be, and in some embodiments is, configured to rectify the AC input voltage $AC_{in}$ to provide a full-wave rectified output voltage signal $AC_{rect}$. A variety of rectifier circuit configurations are well-known in the art and are usable in embodiments without departing from the scope of the invention. In some embodiments, for example, the rectifier circuit 202 includes a known diode bridge rectifier. In some embodiments, for example, the rectifier circuit 202 includes a known field effect transistor (FET) bridge rectifier. The output of the rectifier circuit 202 is coupled to the solid state light source 106 through the switching converter circuit 204 and, optionally, through the energy storage circuit 203. The mixing circuit 206 switches current through one or more solid state light sources in the solid state light source 106, to thereby change the state of such solid state light sources from a non-light-emitting ("off") state to a light-emitting ("on") state. The timing of the switching of the mixing circuit 206 may be, and in some embodiments is, established, for example, by using a controller for controlling a switch coupled to the solid state light source 106, or by switching without a dedicated controller in response to each of a plurality of consecutive half-waves of the rectified AC voltage $AC_{rect}$. The solid state light source 106 may, and in some embodiments does, include at least one additional solid state light source configured to remain in a light-emitting ("on") state while the mixing circuit 206 switches current through one or more other solid state light sources of the solid state light source 106. The solid state light source 106 may be, and in some embodiments is, configured such that the variation in the "on" and "off" states of the solid state light sources therein in response to the output of the mixing circuit 206, in combination with the light output from any additional solid state light source(s) that remain in an "on" state, establishes a predetermined mixing of the outputs of the solid state light sources.

For example, in embodiments where the solid state light sources in the solid state light source 106 are of different colors, the mixing of the outputs of the solid state light sources establishes a desired color mixing through combination of the light output from the solid state light sources at a distance. The term "color" is generally used throughout to refer to a property of radiation that is perceivable by an observer (though this usage is not intended to limit the scope of this term). Accordingly, the term "different colors" implies two different spectra with different dominant wavelengths and/or bandwidths. In addition, "color" may be used to refer to white and non-white light. Use of a specific color such as "red", "amber", "mint", "green", "greenish-white", etc. to describe solid state light source or the light emitted by a solid state light source refers to a specific range of dominant wavelengths associated with the specific color. In particular, the terms "red" and "amber", when used to describe a solid state light source or the light emitted by the solid state light source, means the solid state light source emits light with a dominant wavelength between 610 nm and 750 nm/substantially 610 nm and 750 nm. The terms "green", "mint", and "greenish-white", when used to describe a solid state light source or the light emitted by the solid state light source means the solid state light source emits light with a dominant wavelength between 495 nm and 570 nm/substantially 495 nm and 570 nm.

Switching of the solid state light source(s) in the solid state light source 106 between an "on" state and "off" state may, and in some embodiments does, produce a varying output voltage $DC_{out}$ for the driver circuit 102 that is sometimes greater than the rectified AC voltage $AC_{rect}$ and is sometimes less than the rectified AC voltage $AC_{rect}$. In some embodiments, for example, the rectified AC voltage $AC_{rect}$ may vary from substantially 0 V to substantially 17 V, while the output voltage $DC_{out}$ may be substantially 16V when all the solid state light sources are driven, but only substantially 10V when some subset of the solid state light sources are driven. The switching converter circuit 204 responds to the varying output voltage $DC_{out}$ by taking a buck converter configuration when the switching of the solid state light sources by the mixing circuit requires an output voltage $DC_{out}$ that is lower than the rectified AC voltage $AC_{rect}$, and a boost configuration when the switching of the solid state light sources by the mixing circuit requires an output voltage $DC_{out}$ is higher than the rectified AC voltage $AC_{rect}$. As used throughout, the term "buck" converter describes the well-known step-down (i.e., the output voltage is less than the input voltage) DC-DC switching converter configuration including two switches (for example but not limited to a transistor and a diode) and an inductor. As used throughout, the term "boost" converter describes the well-known step-up (i.e., the output voltage is greater than the input voltage) DC-DC switching converter configuration including two switches (for example, but not limited to, a transistor and a diode) and an inductor.

The optional energy storage circuit 203 is coupled to the rectified AC voltage $AC_{rect}$. The energy storage circuit 203 is configured couple the rectified AC voltage $AC_{rect}$ directly to the switching converter circuit 204 when the voltage $AC_{rect}$ is above a predetermined value, and to discharge stored energy through the switching converter circuit 204 when the voltage $AC_{rect}$ is below the predetermined value. The energy storage circuit 203 may thus reduce the peak current to the switching converter circuit 204 and may fill the voltage "valleys" in the rectified AC voltage $AC_{rect}$ by discharging stored energy through the switching converter circuit 204 when the voltage $AC_{rect}$ drops to provide a smoothened output to the switching converter circuit 204.

Figure 3:
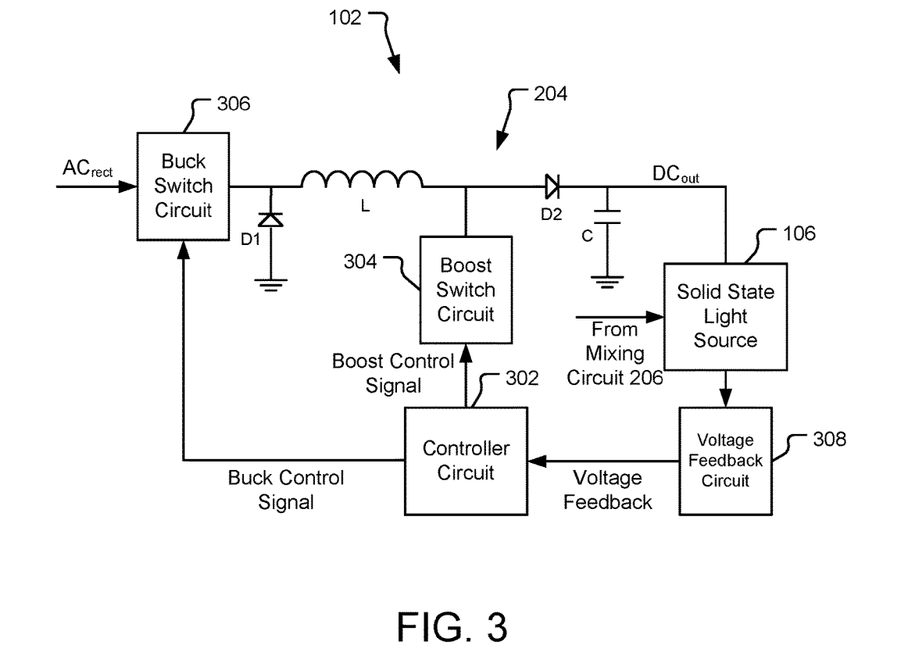
FIG. 3 is a block diagram of a switching converter circuit coupled to a light source according to embodiments disclosed herein.

The switching converter circuit 204 may be provided in a variety of configurations. FIG. 3 illustrates a driver circuit 102 including a switching converter circuit 204 and a solid state light source 106. In FIG. 3, the switching converter circuit 204 includes a controller circuit 302, a boost switch circuit 304, a buck switch circuit 306, a voltage feedback circuit 308, diodes D1 and D2, an inductor L, and a capacitor C. The controller circuit 302 controls both the boost switch circuit 304 and the buck switch circuit 306 in response to voltage feedback from the voltage feedback circuit 308. The voltage feedback is representative of the output voltage $DC_{out}$ across the solid state light source 106. The output voltage $DC_{out}$ varies as solid state light source(s) within the solid state light source 106 are switched "on" and "off" by the mixing circuit 206, as described above with regards to FIG. 2.

When the output voltage $DC_{out}$ is lower than the rectified AC voltage $AC_{rect}$, the controller circuit 302 provides a buck control signal to the buck switch circuit 306. The buck control signal causes the buck switch circuit 306 to regulate current to the solid state light source 106 using a buck converter configuration including the buck switch circuit 306, the diode D1, the inductor L, and the capacitor C. However, when the output voltage $DC_{out}$ is higher than the rectified AC voltage $AC_{rect}$, the controller circuit 302 provides a boost control signal to the boost switch circuit 304. The boost control signal causes the boost switch circuit 304 to regulate current to the solid state light source 106 using a boost converter configuration including the boost switch circuit 304, the diode D2, the inductor L, and the capacitor C. The controller circuit 302 thus performs at least three functions in response to the voltage feedback from the voltage feedback circuit 308. The controller circuit 302 switches between buck and boost converter configurations in response to the voltage feedback. The controller circuit 302 regulates the boost switch circuit 304 to provide the output $DC_{out}$ from a boost converter configuration. The controller circuit 302 regulates the buck switch circuit 306 to provide the output $DC_{out}$ from a buck converter configuration.

Figure 4:
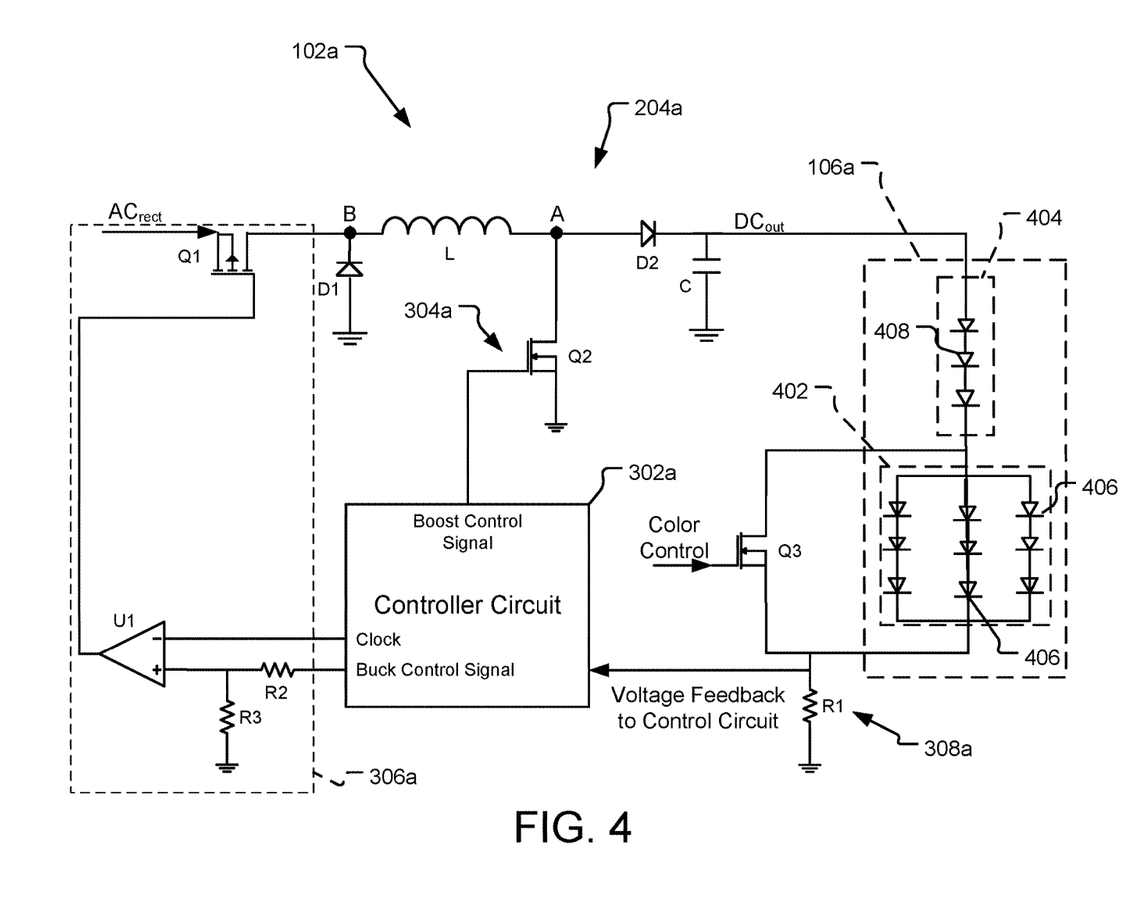
FIG. 4 is a circuit diagram of a switching converter circuit coupled to a light source according to embodiments disclosed herein.

FIG. 4 is a circuit diagram of a driver circuit 102a based on the driver circuit 102 shown in FIG. 3. The driver circuit 102a includes a switching converter circuit 204a, a solid state light source 106a, and a switch Q3. The switch Q3 is associated with a mixing circuit, such as but not limited to the mixing circuit 206 shown in FIG. 2. The switching converter circuit 204a includes a controller circuit 302a, a boost switch circuit 304a, a buck switch circuit 306a, a voltage feedback circuit 308a, diodes D1 and D2, an inductor L, and a capacitor C. The solid state light source 106a includes a first set of solid state light sources 402 and a second set of solid state light sources 404. The first set of solid state light sources 402 includes a plurality of series combinations of solid state light sources 406 coupled in a parallel combination. In some embodiments, the solid state light sources 406 in the first set of solid state light sources 402 all emit a red or an amber color of light. The second set of solid state light sources 404 includes a series combination of solid state light sources 408. In some embodiments, the solid state light source 408 in the second set of solid state light sources 404 all emit a green or a mint or a greenish-white color of light. In FIG. 4, the switch Q3 is configured as a transistor coupled in parallel with the first set of solid state light sources 402. The parallel combination of the switch Q3 and the first set of solid state light sources 402 is coupled in series with the second set of solid state light sources 404. Of course, the first set of solid state light sources 402 and the second set of solid state light sources 404 may each include any number of solid state light sources in any configuration.

A conducting state of the switch Q3 controls current through the first set of solid state light sources 402 and the second set of solid state light sources 404, and varies in response to a color control signal in the mixing circuit. When the switch Q3 is in a non-conducting state, i.e. the switch Q3 is "open", sufficient current from the switching converter circuit 204a flows through both the first set of solid state light sources 402 and the second set of solid state light sources 404 to cause the respective solid state light sources 406, 408 of each set to emit light. When the switch Q3 is in a conducting state, i.e. the switch Q3 is "closed", current flows through the second set of solid state light sources 404 to cause the solid state light sources 408 in the second set of solid state light sources 404 to emit light, but current flow through the first set of solid state light sources 402 is shunted through the switch Q3, whereby current through the first set of solid state light sources 402 is insufficient to cause the solid state light sources 406 in the first set of solid state light sources 402 to emit light, although there may be some small current through the first set of solid state light sources 402 when a switch Q1 is in a conducting state.

The voltage feedback circuit 308a is configured as a resistor R1 coupled in series with the parallel combination of the switch Q3 and the first set of solid state light sources 402, which is coupled in series with the second set of solid state light sources 404. As the switch Q3 opens and closes and the solid state light sources 406 of the first set of solid state light sources 402 turn "on" and "off", the voltage $DC_{out}$ varies, resulting in a varying voltage across the resistor R1. The (varying) voltage across the resistor R1 is provided as the voltage feedback signal to the controller circuit 302a, and is representative of the value of the output voltage $DC_{out}$.

The controller circuit 302a may be a known controller that is configured in a manner according to embodiments disclosed herein to control both the buck switch circuit 306a and the boost switch circuit 304a. A variety of controllers for controlling a switching regulator are well-known. In some embodiments, for example, the controller circuit 302a is a model number TPS40211 controller presently available from Texas Instruments Corporation of Dallas, Tex., USA. The controller circuit 302a is configured to provide a boost control signal output, e.g. a pulse-width modulated (PWM) output, to the boost switch circuit 304a, to control the conducting state of the boost switch circuit 304a. The controller circuit 302a is also configured to provide a buck control signal to control the conducting state of the switch Q1 in the buck switch circuit 306a. In FIG. 4, the boost switch circuit 304a is configured as an N-channel field effect transistor (FET) Q2 having a drain coupled to a node A between the inductor L and the diode D2 and a source coupled to ground. The capacitor C is coupled from the output of the diode D2 to ground, and the output voltage $DC_{out}$ is provided across the capacitor C. A gate of the FET Q2 is coupled to the boost control signal output of the controller circuit 302a, so that the boost control output controls the conducting state of the FET Q2. Although the boost switch circuit 304a shown in FIG. 4 is configured as a transistor, is to be understood that any switch circuit described herein may be any component or set of components having a conducting or "closed" state and a non-conducting or "open" state.

The buck switch circuit 306a includes a comparator U1 and the switch Q1. The switch Q1 is configured as a P-channel FET and is coupled between the rectified AC voltage $AC_{rect}$ and the inductor L, with a source coupled to the rectified AC voltage $AC_{rect}$ and a drain coupled to the inductor L. A node B is located between the switch Q1 and the inductor L. The diode D1 is coupled between ground and the node B. The comparator U1 has an inverting input coupled to a clock output of the controller circuit 302a, and a non-inverting input coupled to a buck control signal output of the controller circuit 302a through a resistor R2. The non-inverting input of the comparator U1 is also coupled to ground through a resistor R3. An output of the comparator U1 is coupled to a gate of the switch Q1 to control the conducting state of the switch Q1. The comparator U1 compares the voltage level at the inverting input to the voltage level at the non-inverting input and provides a voltage output to the gate of the switch Q1 in response to the comparison.

The buck control signal output may be, and in some embodiments is, an output of the controller circuit 302a that varies in response to the voltage feedback signal from the voltage feedback circuit 308a. In embodiments where the controller circuit 302a is configured as a TPS 40211 controller, for example, the buck control signal output is an error amplifier output of the controller circuit 302a. In such a configuration, the clock output of the controller circuit 302a may be a saw tooth oscillating between substantially 0.2 V and 1 V. When the output voltage $DC_{out}$ is lower than the rectified voltage $AC_{rect}$, the output of the error amplifier stays at substantially 3 V, but if the rectified voltage $AC_{rect}$ exceeds the output voltage $DC_{out}$, the current through the solid state light source 106a rises and the output of the error amplifier falls into a range of substantially 0V to 1V. Thus, when the output voltage $DC_{out}$ is lower than the input voltage $AC_{rect}$, the voltage feedback signal to the controller circuit 302a causes the buck control output of the controller circuit 302a to exceed the value of the clock output, which holds the output of the comparator U1 at a level that places the switch Q1 in a conducting state. Meanwhile, the boost control signal output of the controller circuit 302a is pulsed according to a PWM set by the controller circuit 302a to switch the boost switch circuit 304a between conducing and non-conducing states to regulate current to the solid state light source 106a using a boost converter configuration including the boost switch circuit 304a, the diode D2, the inductor L, and the capacitor C. However, when the output $DC_{out}$ is higher than the rectified voltage $AC_{rect}$, the voltage feedback signal to the controller circuit 302a causes the boost control signal output to place the FET Q2 in an open state. Meanwhile, the buck control output drops below the value of the clock output, causing a PWM output from the comparator U1 at the frequency of the clock output. The PWM output of the comparator U1 switches the switch Q1 between conducing and non-conducting states to regulate current to the solid state light source 106a using a buck converter configuration including the switch Q1, the diode D1, the inductor L, and the capacitor C.

Accordingly, the control circuit 302a performs selection of the converter configuration, i.e. buck or boost, in response to the voltage feedback signal, and regulates the buck switch circuit 306a or boost switch circuit 304a for delivering current to the solid state light source 106a. Advantageously, the controller circuit 302a may be a known switching controller circuit, such as a TPS 40211, wherein the buck control signal is the switching converter output of the controller circuit 302a and the boost control signal is the error amplifier output of the controller circuit 302a, which is coupled to a comparator U1 with the clock output of the controller circuit 302a to control a buck configuration of the switching converter. Use of a single controller circuit 302a allows for efficient delivery of energy to the solid state light source 106a, in a small package size and at reduced cost. In addition, sharing of components, such as the inductor L and capacitor C between the boost and buck converter configurations, allows for reduced space and small package size.

Figure 5:
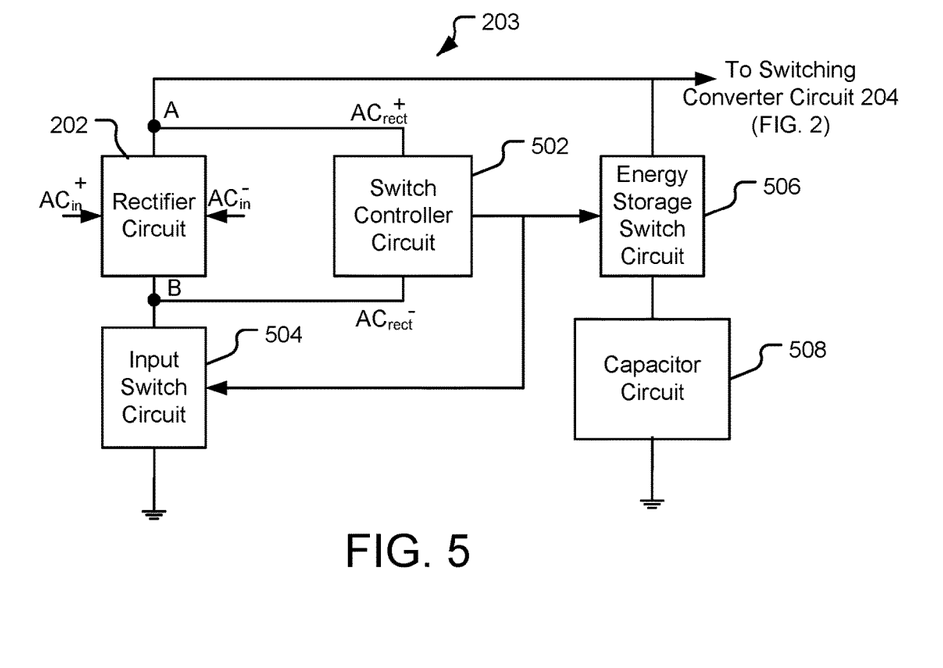
FIG. 5 is a block diagram of an energy storage circuit according to embodiments disclosed herein.

FIG. 5 shows an energy storage circuit 203 coupled to a rectifier circuit 202. The energy storage circuit 203 includes a switch controller circuit 502, an input switch circuit 504, an energy storage switch circuit 506, and a capacitor circuit 508. In FIG. 5, the rectifier circuit 202 and the input switch circuit 504 are coupled in series across the switching converter circuit 204, which is shown in FIG. 2. The energy storage switch circuit 506 and the capacitor circuit 508 are coupled in series across the input to the switching converter circuit 204, and in parallel with the series combination of the rectifier circuit 202 and the input switch circuit 504. Although the energy storage circuit 203 is shown and described herein as being configured for coupling a rectified AC voltage to the switching converter circuit 204, it is to be understood that the energy storage circuit 203 may be, and in some embodiments is, configured to couple a rectified AC voltage to any load.

The switch controller circuit 502 has a first input coupled to the positive output $AC_{rect+}$ of the rectifier circuit 202, i.e. a node A in FIG. 5, and a second input coupled to the negative output $AC_{rect-}$ of the rectifier circuit 202, i.e. a node B in FIG. 5. The voltage between the two inputs to the switch controller circuit 502 is thus the voltage at the node A, $V_A$, minus the voltage at the node B, $V_B$, and corresponds to the rectified AC voltage $AC_{rect}$. The switch controller circuit 502 provides an output to the energy storage switch circuit 506 and the input switch circuit 504 in response to the rectified AC voltage $AC_{rect}$ coupled to the inputs of the switch controller circuit 502 at the nodes A and B. In particular, the output of the switch controller circuit 502 controls the conducting state of the input switch circuit 504 and the energy storage switch circuit 506 to couple the rectified AC voltage $AC_{rect}$ from the rectifier circuit 202 to the switching converter circuit 204 when the rectified AC voltage $AC_{rect}$ is higher than a predetermined level. With the switches in this configuration, the capacitor circuit 508 charges to store energy, but does not discharge through the rectifier circuit 202 or the switching converter circuit 204. When the rectified AC voltage $AC_{rect}$ drops below the predetermined level, the output of the switch controller circuit 502 controls the conducting state of the input switch circuit 504 and the energy storage switch circuit 506 to decouple the rectified AC voltage $AC_{rect}$ from the switching converter circuit 204 and to couple the capacitor circuit 508 to the switching converter circuit 204. With the switches in this configuration, the energy stored in the capacitor circuit 508 discharges through the switching converter circuit 204, but not into the rectifier circuit 202.

Figure 6:
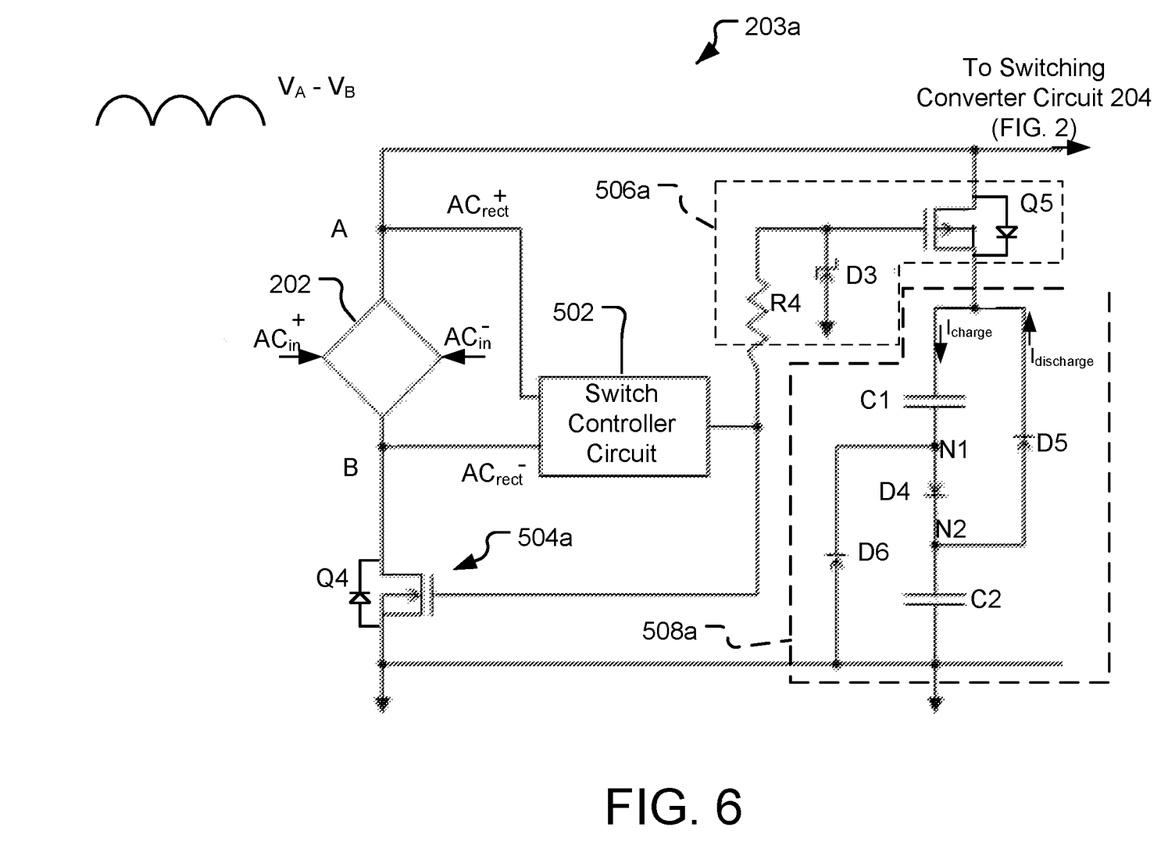
FIG. 6 is a circuit diagram of an energy storage circuit according to embodiments disclosed herein.

FIG. 6 is a circuit diagram of an energy storage circuit 203a coupled to a rectifier circuit 202. The energy storage circuit 203a includes a switch controller circuit 502, an input switch circuit 504a, an energy storage switch circuit 506a, and capacitor circuit 508a. In FIG. 6, the switch controller circuit 502 has first and second inputs coupled to the positive $AC_{rect+}$ and negative $AC_{rect-}$ sides of the rectifier circuit 202 at nodes A and B, respectively. The voltage between the two inputs to the switch controller circuit 502 is thus the voltage at the node A, $V_A$, minus the voltage at the node B, $V_B$, and corresponds to the rectified AC voltage $AC_{rect}$, which is diagrammatically illustrated in the top left corner of FIG. 6 as $V_A$-$V_B$. The switch controller circuit 502 provides an output to the input switch circuit 504a and the energy storage switch circuit 506a in response to the rectified AC voltage $AC_{rect}$. The switch controller circuit 502 may be, and in some embodiments is, any type of controller configured to provide an output for controlling the input switch circuit 504a and the energy storage switch circuit 506a in response to the rectified AC voltage $AC_{rect}$.

The input switch circuit 504a is configured as a N-channel FET Q4 having a drain coupled to a negative side of the rectifier circuit 202, i.e. to $AC_{rect-}$, at the node B and a source coupled to ground. The energy storage switch circuit 506a includes a resistor R4, a Zener diode D3, and a P-channel FET Q5 having a drain coupled to the input of the switching converter circuit 204 and a source coupled to the capacitor circuit 508a. The output of the switch controller circuit 502 is coupled to a gate of the P-channel FET Q5 through the resistor R4, and the Zener diode D3 is reverse biased between the gate of the P-channel FET Q5 and ground. In FIG. 6, the capacitor circuit 508a includes a first capacitor C1, a second capacitor C2, a first diode D4, a second diode D5, and a third diode D6. The first diode D4, the second diode D5, and the third diode D6 are configured such that for a charging current $I_{charge}$, the first capacitor C1 and the second capacitor C2 are coupled in series with the first diode D4, but for a discharging current $I_{discharge}$ to the switching converter circuit 204, the first capacitor C1 and the second capacitor C2 are coupled in parallel. In particular, the first capacitor C1 is coupled between the drain of the P-channel FET Q5 and a node N1 that is coupled to ground by the reverse biased third diode D6. The first diode D4 is coupled between the node N1 and a node N2. The second capacitor C2 is coupled between the node N2 and ground. The second diode D5 is coupled from the drain of the P-channel FET Q5 to the node N2 in a reverse biased configuration.

In operation, when the rectified AC voltage $AC_{rect}$ is above a predetermined value set by the switch controller circuit 502, e.g. when $AC_{rect}$ is above one-third of its peak value, the output of the switch controller circuit 502 places the N-channel FET Q4 in a closed state to couple the rectified AC voltage $AC_{rect}$ across the switching regulator 204. The output of the switch controller circuit 502 is also coupled to the gate of the P-channel FET Q5 through the resistor R4. The output of the switch controller circuit 502 establishes a gate voltage at the P-channel FET Q5 equal to the Zener voltage of the Zener diode D3. In embodiments where the peak voltage of the rectified AC voltage $AC_{rect}$ is, for example, substantially 17, the Zener voltage of the Zener diode D3 may be substantially 7.5 V. Since this voltage is nearly equal to, or greater than, the parallel voltage across the first capacitor C1 or the second capacitor C2, the first capacitor C1 and the second capacitor C2 cannot discharge. If the rectified AC voltage $AC_{rect}$ is higher than the voltage across the series combination of the first capacitor C1 and the second capacitor C2, the first capacitor C1 and the second capacitor C2 are charged through the protection diode of the P-channel FET Q5. If the rectified AC voltage $AC_{rect}$ is higher than the Zener voltage of the Zener diode D3, the first capacitor C1 and the second capacitor C2 may be, and in some embodiments are, charged by current flowing backward through the P-channel FET Q5.

When the rectified AC voltage $AC_{rect}$ drops below the predetermined value set by the switch controller circuit 502, the output of the switch controller circuit 502 places the N-channel FET Q4 in an open state to decouple the rectified AC voltage $AC_{rect}$ from the switching converter circuit 204 and places the P-channel FET Q5 in a closed state to couple the capacitor circuit 508a to the switching converter circuit 204. In this configuration, the first capacitor C1 and the second capacitor C2 are coupled in parallel through the second diode D5 and the third diode D6 to produce a discharge current $I_{discharge}$. Thus, during times when the rectified AC voltage $AC_{rect}$ is low, i.e. in the valleys of the rectified AC voltage $AC_{rect}$, the capacitor circuit 508a discharges through the switching converter circuit 204.

Advantageously, an energy storage circuit 203/energy storage circuit 203a as shown herein establishes more consistent power delivery to the switching converter circuit 204, thereby improving the efficacy of the light source powered by the driver circuit 102 that includes the switching converter circuit 204. In some embodiments, wherein each of the first capacitor C1 and the second capacitor C2 shown in FIG. 6 are configured as a 200 microfarad bank of capacitors, the peak rectified AC voltage $AC_{rect}$ is substantially 17 V, and the Zener voltage of the Zener diode D3 is substantially 7.5 V, a light source efficacy improvement of about 5% may be achieved.

Figure 7:
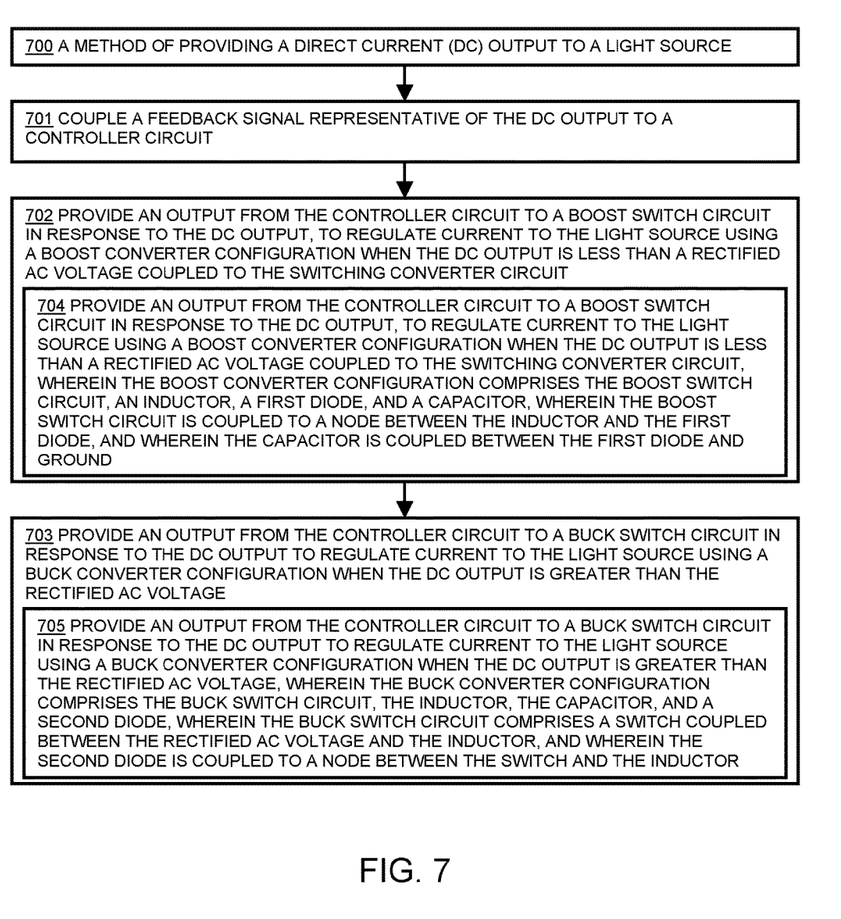
FIGS. 7 and 8 are flowchart of methods according to embodiments disclosed herein.
Figure 8:
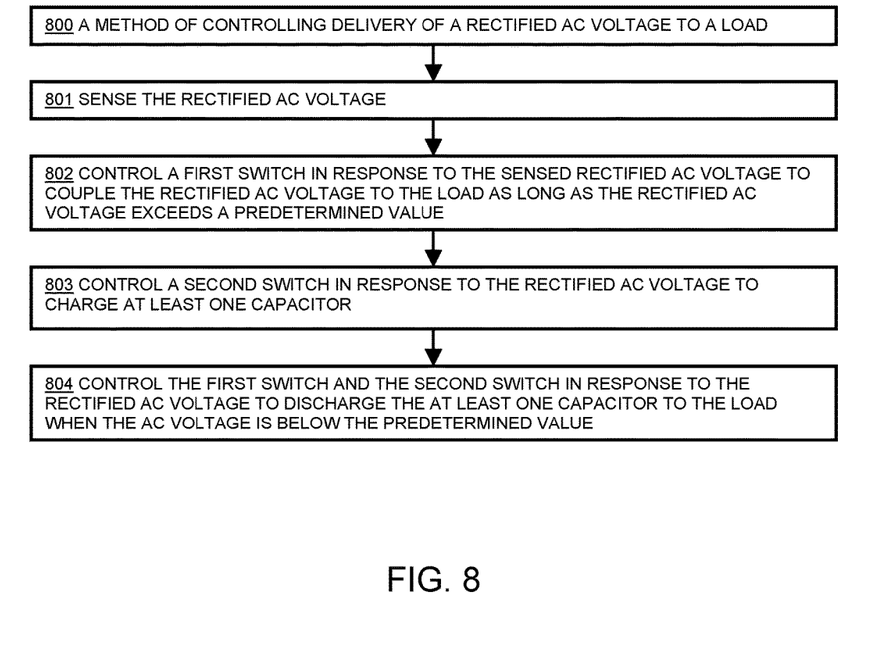

FIGS. 7 and 8 are flowcharts of a method 700 and a method 800, as described herein. Each flowchart illustrates the functional information one of ordinary skill in the art requires to fabricate circuits and/or to generate computer software/firmware to perform the processing required in accordance with embodiments. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Further, while FIGS. 7 and 8 illustrate various operations, it is to be understood that not all of the operations depicted in FIGS. 7 and 8 are necessary for other embodiments to function. Indeed, it is fully contemplated herein that in other embodiments of the present disclosure, the operations depicted in FIGS. 7 and/or 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

More particularly, in the method 700 of FIG. 7, a direct current (DC) output is provided to a light source. A feedback signal, representative of the DC output, is coupled to a controller circuit, step 701. An output is provided from the controller circuit to a boost switch circuit in response to the DC output, step 702, to regulate current to the light source using a boost converter configuration when the DC output is less than a rectified AC voltage coupled to the switching converter circuit. In some embodiments, an output is provided from the controller circuit to a boost switch circuit in response to the DC output, step 704, to regulate current to the light source using a boost converter configuration when the DC output is less than a rectified AC voltage coupled to the switching converter circuit, wherein the boost converter configuration comprises the boost switch circuit, an inductor, a first diode, and a capacitor, wherein the boost switch circuit is coupled to a node between the inductor and the first diode, and wherein the capacitor is coupled between the first diode and ground. An output is provided from the controller circuit to a buck switch circuit, step 703, in response to the DC output to regulate current to the light source using a buck converter configuration when the DC output is greater than the rectified AC voltage. In some embodiments, an output is provided from the controller circuit to a buck switch circuit in response to the DC output, step 705, to regulate current to the light source using a buck converter configuration when the DC output is greater than the rectified AC voltage, wherein the buck converter configuration comprises the buck switch circuit, the inductor, the capacitor, and a second diode, wherein the buck switch circuit comprises a switch coupled between the rectified AC voltage and the inductor, and wherein the second diode is coupled to a node between the switch and the inductor.

In the method 800 of FIG. 8, delivery of a rectified AC voltage to a load is controlled. The rectified AC voltage is sensed, step 801, using any known method. A first switch is controlled in response to the sensed rectified AC voltage, step 802, to couple the rectified AC voltage to the load as long as the rectified AC voltage exceeds a predetermined value. A second switch is controlled, step 803, in response to the rectified AC voltage to charge at least one capacitor. The first switch and the second switch are controlled, step 804, in response to the rectified AC voltage to discharge the at least one capacitor to the load when the AC voltage is below the predetermined value.

Any embodiments capable of being implemented in hardware or software, or combinations thereof, are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

The term "coupled" as used throughout refers to any connection, coupling, link or the like, by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

As used throughout, a "circuit" or "circuitry" may comprise, for example, singly or in any combination, hardwired circuitry, programmable circuitry, state machine circuitry, and/or firmware that stores instructions executed by programmable circuitry. In at least some embodiments, the controller circuit 302 and/or the switch controller circuit 502 comprise one or more integrated circuits. An "integrated circuit" may be a digital, analog or mixed-signal semiconductor device and/or microelectronic device, such as, for example, but not limited to, a semiconductor integrated circuit chip.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. An energy storage circuit comprising:
   a switch controller circuit;
   an input switch circuit coupled to the switch controller circuit and a rectifier circuit, wherein the rectifier circuit comprises a first lead and a second lead, wherein the first lead is directly connected to a node A and the second lead is directly connected to a node B, wherein the input switch circuit comprises a transistor, wherein the transistor comprises a drain and a source, wherein the drain is directly connected to the node B, and wherein the source is directly connected to ground, such that the transistor is coupled between the rectifier circuit and ground; and
   an energy storage switch circuit coupled to the switch controller circuit and a capacitor circuit;
   wherein the switch controller circuit is configured to provide a controller output to the input switch circuit and the energy storage switch circuit in response to a rectified AC voltage, to couple the rectified AC voltage to a load and to charge the capacitor circuit when the rectified AC voltage is greater than a predetermined value, and to couple the capacitor circuit to the load to discharge the capacitor circuit through the load when the rectified AC voltage is less than the predetermined value.

2. The energy storage circuit of claim 1, wherein the input switch circuit and the rectifier circuit are coupled in series across the load.

3. The energy storage circuit of claim 1, wherein the energy storage switch circuit and the capacitor circuit are coupled in series across the load.

4. The energy storage circuit of claim 1, wherein the controller output is coupled to a gate of the transistor.

5. The energy storage circuit of to claim 1, wherein the energy storage switch circuit comprises a transistor coupled in series with the capacitor circuit, wherein the controller output is coupled to a gate of the transistor, and wherein a Zener diode is coupled between the gate of the transistor and ground.

6. The energy storage circuit of claim 1, wherein the capacitor circuit comprises first and second capacitors configured to charge in a series configuration and to discharge in a parallel configuration.

7. The energy storage circuit of claim 1, wherein the capacitor circuit comprises a first capacitor, a second capacitor, a first diode, as second diode, and a third diode, wherein the first capacitor, the second capacitor, and the first diode are connected in series between the energy storage switch circuit and ground, the second diode is connected in parallel across the first capacitor and the first diode, and the third diode is connected in parallel across the first diode and the second capacitor, wherein first capacitor and the second capacitor are configured to charge in a series configuration and to discharge in a parallel configuration.

\* \* \* \* \*